(12) United States Patent
Beck (10) Patent No.: US 7,481,597 B2
(45) Date of Patent: Jan. 27, 2009

(54) COUPLER FOR CABLE TROUGH

(75) Inventor: Ronald A. Beck, St. Paul, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/677,181

(22) Filed: Feb. 21, 2007

(65) Prior Publication Data

US 2008/0199251 A1    Aug. 21, 2008

(51) Int. Cl.
*F16B 2/00*   (2006.01)

(52) U.S. Cl. ....................................... 403/387

(58) Field of Classification Search ............... 174/72 C, 174/97; 403/263, 293, 387, 325, 109.3; 248/68.1, 49; 385/134
See application file for complete search history.

(56) References Cited

U.S. PATENT DOCUMENTS

| | | | |
|---|---|---|---|
| 2,316,166 A | 4/1943 | Huguelet |
| 2,360,159 A | 10/1944 | Peck |
| 2,741,499 A | 4/1956 | Kussmaul |
| 2,821,154 A | 1/1958 | Tennison, Jr. |
| 2,823,056 A | 2/1958 | DiMeo et al. |
| 2,834,622 A | 5/1958 | Reeves |
| 2,880,887 A | 4/1959 | McClurg |
| 2,891,750 A | 6/1959 | Bergquist |
| 3,022,972 A | 2/1962 | Bunston |
| 3,042,351 A | 7/1962 | Du Bois |
| 3,188,030 A | 6/1965 | Fischer |
| 3,351,699 A | 11/1967 | Merckle |
| 3,370,121 A | 2/1968 | Merckle |
| 3,457,598 A | 7/1969 | Mariani |
| 3,471,629 A | 10/1969 | O'Leary |
| 3,493,917 A | 2/1970 | Glowacz |
| 3,603,625 A | 9/1971 | Cottrell et al. |
| 3,782,420 A | 1/1974 | Kolb et al. |
| 3,875,618 A | 4/1975 | Schuplin |
| 3,915,420 A | 10/1975 | Norris |
| 4,099,749 A | 7/1978 | van Vliet |
| 4,305,236 A | 12/1981 | Williams |
| 4,854,665 A | 8/1989 | Gagnon |
| 4,954,015 A | 9/1990 | McGowan |

(Continued)

FOREIGN PATENT DOCUMENTS

DE    3636412 A1    4/1988

(Continued)

OTHER PUBLICATIONS

Exhibit A, Ditel, Inc.; Ditel UPL-1000/UPT-1000/Corner Cable Guides; product information, 2 pages, © 1986.

(Continued)

*Primary Examiner*—Neil Abrams
(74) *Attorney, Agent, or Firm*—Merchant & Gould P.C.

(57) ABSTRACT

Elements, couplers, systems, and methods for joining two or more trough members. A locking element for coupling a coupler to a trough member can include a main body, a clip member configured to couple the main body to the coupler, a first arm extending from the main body, the first arm being configured to flex relative to the main body, and a first barb coupled to the first arm, wherein the first barb extends to a first point configured to engage an exterior surface of a first trough member.

12 Claims, 6 Drawing Sheets

U.S. PATENT DOCUMENTS

| | | | |
|---|---|---|---|
| 5,035,092 | A | 7/1991 | Brant |
| 5,038,528 | A | 8/1991 | Brant |
| 5,067,678 | A | 11/1991 | Henneberger et al. |
| 5,078,530 | A | 1/1992 | Kim |
| 5,100,221 | A | 3/1992 | Carney et al. |
| 5,134,250 | A | 7/1992 | Caveney et al. |
| 5,142,606 | A | 8/1992 | Carney et al. |
| 5,161,580 | A | 11/1992 | Klug |
| 5,316,243 | A | 5/1994 | Henneberger |
| 5,469,893 | A | 11/1995 | Caveney et al. |
| 5,547,307 | A | 8/1996 | Decore et al. |
| 5,617,678 | A | 4/1997 | Morandin et al. |
| 5,720,567 | A | 2/1998 | Rinderer |
| 5,752,781 | A | 5/1998 | Haataja et al. |
| 5,753,855 | A | 5/1998 | Nicoli et al. |
| 5,792,993 | A | 8/1998 | Rinderer |
| D402,262 | S | 12/1998 | Scherer et al. |
| D402,263 | S | 12/1998 | Scherer et al. |
| D413,306 | S | 8/1999 | Scherer et al. |
| 5,995,699 | A | 11/1999 | Vargas et al. |
| 5,998,732 | A | 12/1999 | Caveney et al. |
| D419,962 | S | 2/2000 | Caveney |
| 6,037,543 | A | 3/2000 | Nicoli et al. |
| D430,543 | S | 9/2000 | Rohder |
| 6,126,122 | A | 10/2000 | Ismert |
| 6,143,984 | A | 11/2000 | Auteri |
| 6,188,024 | B1 | 2/2001 | Benito-Navazo |
| 6,193,434 | B1 | 2/2001 | Durin et al. |
| D447,737 | S | 9/2001 | Scherer et al. |
| 6,402,418 | B1 | 6/2002 | Durin et al. |
| 6,424,779 | B1 | 7/2002 | Ellison et al. |
| 6,450,458 | B1 | 9/2002 | Bernard |
| 6,454,485 | B2 | 9/2002 | Holcomb et al. |
| 6,463,631 | B2 | 10/2002 | Noda |
| 6,476,327 | B1 | 11/2002 | Bernard et al. |
| 6,512,875 | B1 | 1/2003 | Johnson et al. |
| 6,520,192 | B1 | 2/2003 | Lo |
| 6,523,791 | B2 | 2/2003 | Bernard et al. |
| 6,603,073 | B2 | 8/2003 | Ferris |
| 6,634,605 | B2 | 10/2003 | Bernard et al. |
| 6,634,825 | B2 | 10/2003 | Tolkoff et al. |
| 6,709,186 | B2 | 3/2004 | Ferris et al. |
| 6,715,719 | B2 | 4/2004 | Ferris et al. |
| 6,810,191 | B2 | 10/2004 | Ferris et al. |
| 7,029,195 | B2 | 4/2006 | Ferris et al. |
| 7,093,997 | B2 | 8/2006 | Ferris et al. |
| 7,175,137 | B2 | 2/2007 | Ferris et al. |
| 7,246,778 | B2 | 7/2007 | Caveney et al. |
| 2002/0006312 | A1 | 1/2002 | Buard |
| 2002/0096606 | A1 | 7/2002 | Bernard et al. |
| 2003/0147690 | A1 | 8/2003 | Ronnquist |
| 2003/0177628 | A1 | 9/2003 | Viklund |
| 2003/0183731 | A1 | 10/2003 | Ferris et al. |
| 2003/0183732 | A1 | 10/2003 | Nault et al. |
| 2004/0104313 | A1* | 6/2004 | Haataja et al. ............ 248/49 |
| 2004/0159750 | A1 | 8/2004 | Ferris et al. |
| 2006/0210356 | A1 | 9/2006 | Ferris et al. |
| 2006/0261240 | A1 | 11/2006 | Ferris et al. |

FOREIGN PATENT DOCUMENTS

| | | |
|---|---|---|
| EP | 0 315 023 A2 | 5/1989 |
| EP | 0 571 307 A1 | 11/1993 |
| EP | 0 486 442 B1 | 10/1995 |
| EP | 0 874 260 A1 | 10/1998 |
| EP | 1 033 800 A1 | 9/2000 |
| EP | 1 160 949 A2 | 12/2001 |
| EP | 1 160 950 A2 | 12/2001 |
| EP | 1 249 912 A1 | 10/2002 |
| FR | 1479341 | 5/1967 |
| GB | 549840 | 12/1942 |
| GB | 1 342 085 | 12/1973 |
| WO | 99/06746 | 2/1999 |
| WO | 00/75550 | 12/2000 |
| WO | 02/18991 | 3/2002 |
| WO | 02/31939 | 4/2002 |
| WO | 02/33445 | 4/2002 |
| WO | 02/086576 A1 | 10/2002 |

OTHER PUBLICATIONS

Exhibit B, ADC Telecommunicatons, Inc.; FiberGuide™, Fiber Management System, 6 pages front and back printed, 16/1989.

Exhibit C, Warren & Brown Technologies Pty. Ltd., Fibre Optic Management Systems, Component Selection Guide, 19 pages of product information. Source: www.warrenandbrown.com.au (admitted prior art as of the filing date).

Exhibit D, Panduit Network Connectivity Group, FiberRunner™ 6x4 Routing System Product Brochure, 2 pages, © Panduit Corp. 2000.

Exhibit E, Panduit Corp. FiberRunner™ 4x4 Quiklock™ Coupler (FRBC4X4) Customer Drawing, 1 page, Jul. 13, 2001.

Exhibit F, Panduit Corp. FiberRunner™ 6x4 Quiklock™ Coupler (FRBC6X4) Customer Drawing, 1 page, May 10, 2000.

Exhibit G, Panduit Corp. FiberRunner™ 12x4 Quiklock™ Coupler (FRBC12X4) Customer Drawing, 1 page, Jan. 3, 2001.

Exhibits H-Y, Photographs of various Panduit products (admitted prior art as of the filing date).

U.S. Appl. No. 11/425,625, filed on Jun. 21, 2006.
U.S. Appl. No. 11/677,174, filed on Feb. 21, 2007.
U.S. Appl. No. 11/677,184, filed on Feb. 21, 2007.
U.S. Appl. No. 11/677,188, filed on Feb. 21, 2007.
U.S. Appl. No. 11/677,193, filed on Feb. 21, 2007.
U.S. Appl. No. 11/677,200, filed on Feb. 21, 2007.
U.S. Appl. No. 11/677,203, filed on Feb. 21, 2007.

* cited by examiner

COUPLER FOR CABLE TROUGH

RELATED APPLICATIONS

This application is related to the following applications: U.S. patent application Ser. Nos. 11/677,184; 11/677,188; 11/677,193; 11/677,200; 11/677,203; and 11/677,174; all of which were filed on Feb. 21, 2007 and are incorporated by reference herein.

TECHNICAL FIELD

Embodiments disclosed herein relate to systems for the management and routing of telecommunication cables, and, more particularly, to couplers for joining trough members.

BACKGROUND

In the telecommunications industry, optical fiber systems are increasingly used for high-speed signal transmission. With the increased utilization of optical fiber systems, optical fiber cable management requires industry attention.

One area of optical fiber management is the routing of optical fibers from one piece of equipment to another. For example, in a telecommunications facility, optical fiber cables are routed between fiber distribution equipment and optical line terminating equipment. In buildings and other structures that carry such equipment, the cable routing typically takes place in concealed ceiling areas or in other manners to route cables from one location to another.

When routing optical fibers and other cables such as copper wires, it is desirable that a routing system is readily modifiable and adaptable to changes in equipment needs. Accordingly, such routing systems include a plurality of components, such as trough members and couplers, for defining the cable routing paths. The trough members are joined together by couplings. U.S. Pat. Nos. 5,067,678; 5,316,243; 5,752,781; 6,709,186; and 6,715,719 teach cable routing systems that include a plurality of trough members and couplers.

Various concerns arise with the use of couplers for coupling trough members. One concern is that a plurality of hardware is used for joining the trough members. This hardware can be cumbersome. Further, there is sometimes a need to rearrange or change the trough members and couplers. It is desirable to provide couplers that can be disconnected and reconnected.

SUMMARY

Embodiments disclosed herein relate to a system for the management and routing of telecommunication cables, and, more particularly, to elements, couplers, systems, and methods for joining two or more trough members.

One aspect relates to a locking element for coupling a coupler to a trough member. The locking element includes a main body, a clip member configured to couple the main body to the coupler, a first arm extending from the main body, the first arm being configured to flex relative to the main body, and a first barb coupled to the first arm, wherein the first barb extends to a first point configured to engage an exterior surface of a first trough member.

DETAILED DESCRIPTION

As used herein, the terms "couple" and "coupled" mean to join or attach a first element in relation to a second element, whether the attachment is made directly with the second element or indirectly through one or more intermediate components. As used herein, the term "slot" means a space defined by one or more surfaces and can include, without limitation, T-slots, closed slots, flanges, and projections.

Figure 1:
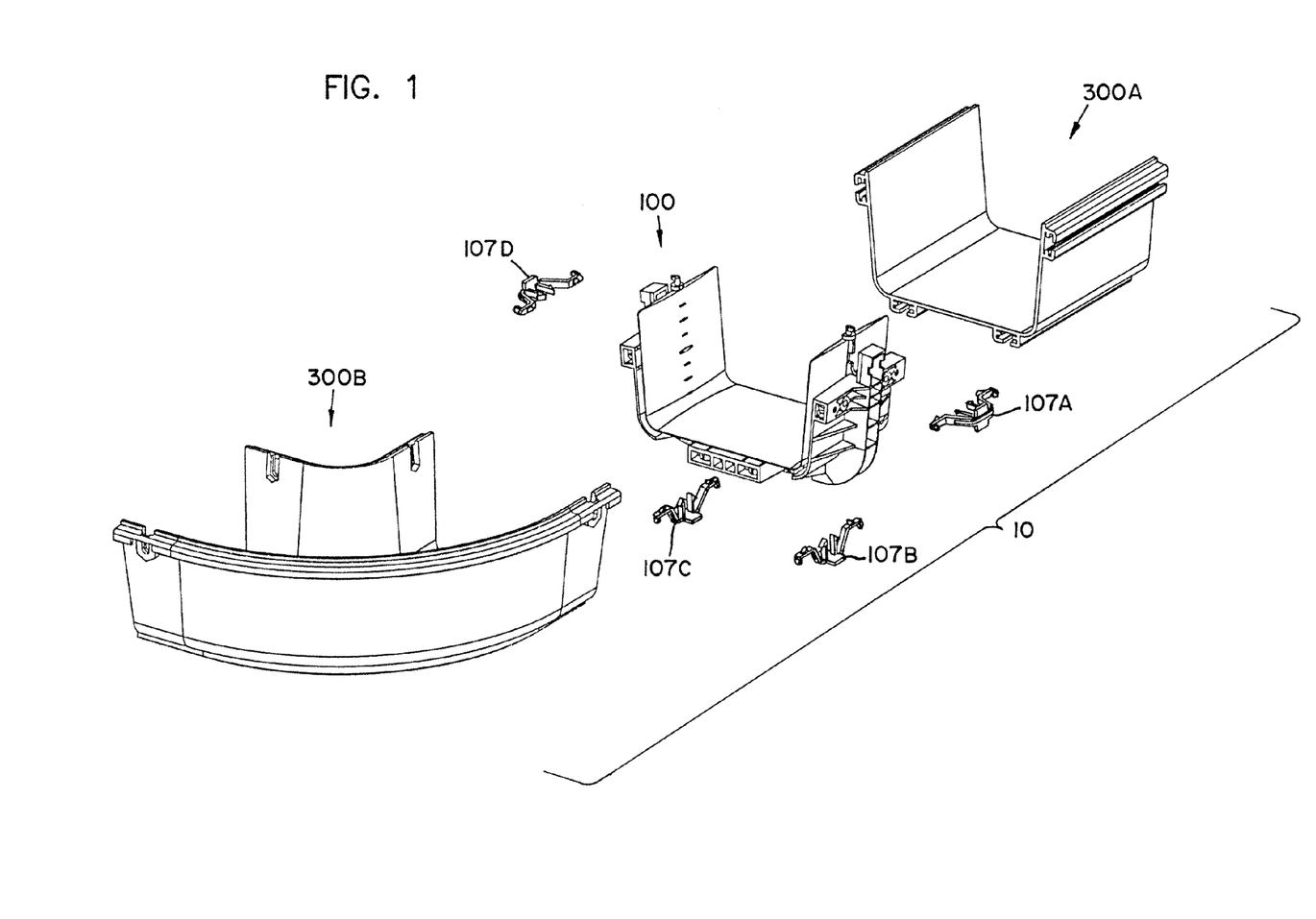
FIG. 1 is a perspective view of an embodiment of a trough system shown in exploded form.

FIG. 1 shows an example trough system 10 including a coupler 100 for interconnecting trough members 300A, 300B. Coupler 100 includes locking elements 107A, 107B, 107C, and 107D that secure the connection between coupler 100 and a trough member, such as trough member 300A. Coupler 100 can also provide secure connections with one or more additional trough members, such as trough member 300B. In addition, coupler 100 can be configured to release the connections between coupler 100 and trough members 300A, 300B.

In example embodiments, locking elements 107A, 107B, 107C, 107D are tool-less (i.e., the locking elements do not require the use of a separate tool to couple trough members 300A, 300B to coupler 100). However, locking elements requiring one or more auxiliary tools are also within the scope of the present disclosure.

I. Coupler

Figure 2:
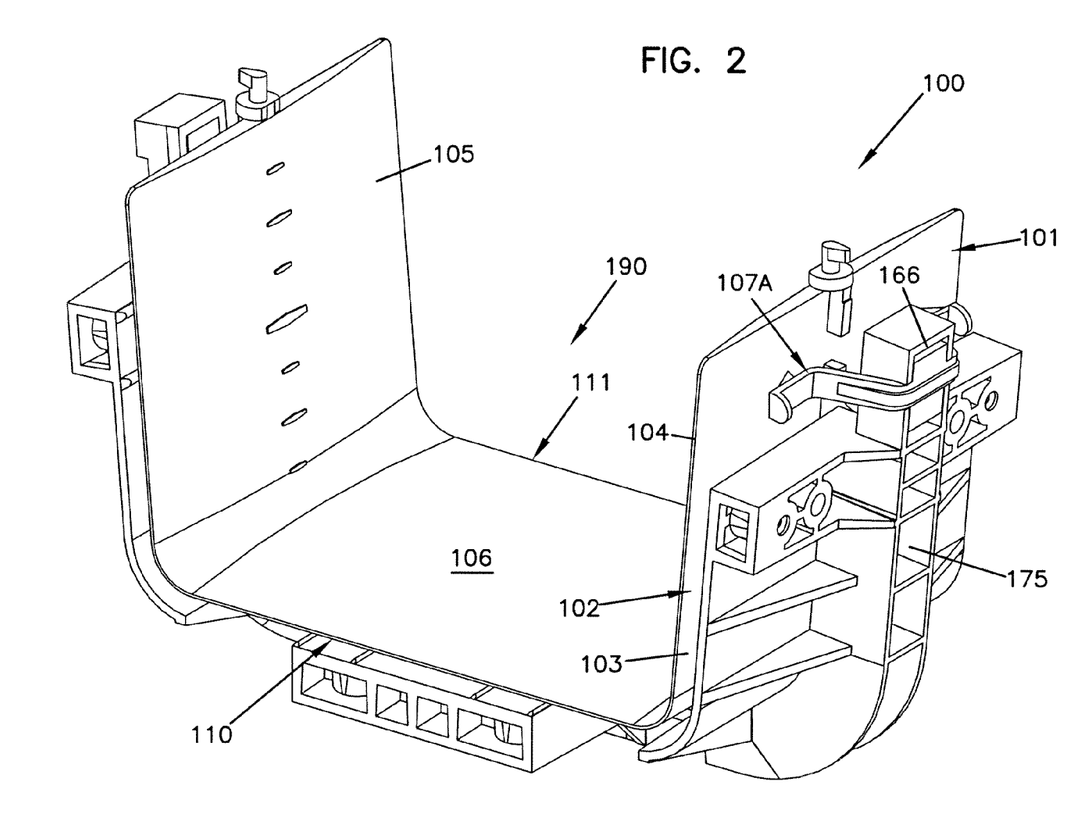
FIG. 2 is a perspective view of an embodiment of a coupler of the trough system of FIG. 1.
Figure 3:
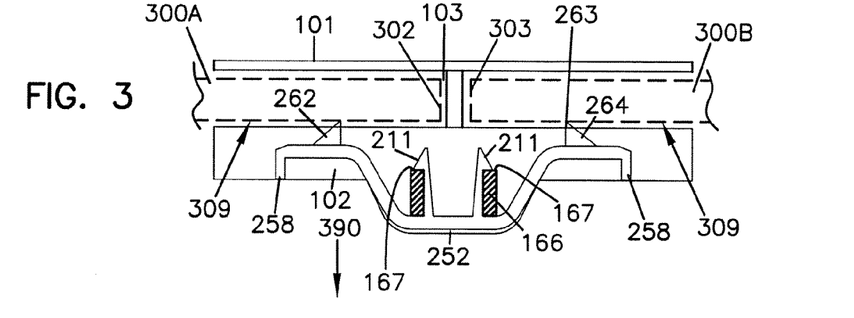
FIG. 3 is a top cross-sectional view of a portion of the coupler of FIG. 2 including two trough members inserted therein.

As shown in FIGS. 2 and 3, coupler 100 includes a first guiding surface 101 and a second guiding surface 102 at least partially surrounding first guiding surface 101, as well as a first coupler end 110 and a second coupler end 111. A spacing 103 is defined between first guiding surface 101 and second guiding surface 102. Spacing 103 is sized to receive a trough member (e.g., trough members 300A, 300B) or another trough system component inserted into the spacing 103 in a longitudinal direction 190.

First guiding surface 101 of coupler 100 is generally in the shape of a trough, including a first side wall portion 104 and a second side wall portion 105, as well as a bottom wall portion 106 joining first and second side wall portions 104 and 105. As used herein, the term "trough" means any structure that defines an interior in which an element such as an optical cable can be maintained. Second guiding surface 102 is also in the shape of a trough. A midpoint or midsection 175 divides coupler 100 into first and second halves, and generally surrounds at least a portion of first guiding surface 101.

Figure 4:
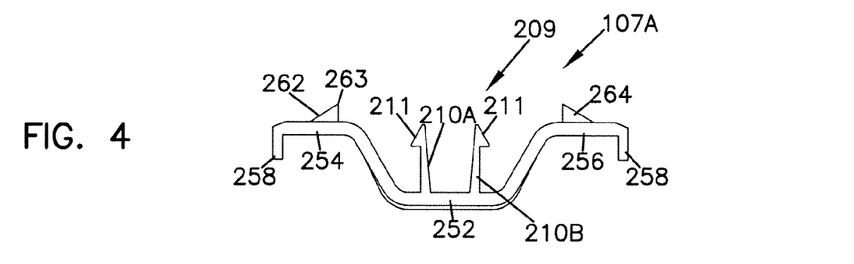
FIG. 4 is a side view of an embodiment of a locking element of the coupler of the trough system of FIG. 1.

Referring now to FIGS. 2-4, locking element 107A is described in more detail. Locking element 107A includes a main body 252 and arms 254, 256 extending therefrom. A clip member 209 of main body 252 is configured to couple locking element 107A to coupler 100. Clip member 209 includes members 210A, 210B with wedges 211 at the ends thereof. Locking element 107A is coupled to coupler 100 by placing members 210A, 210B of clip member 209 through a frame member 166 formed in midpoint 175 of coupler 100. As clip member 209 is placed into frame member 166, wedges 211 engage opposing sides of frame member 166, and members 210A, 210B are compressed towards each other until wedges 211 clear frame member 166. In this position, wedges 211 engage an end 167 of frame member 166 to maintain locking element 107A on coupler 100. Locking element 107A can be removed from coupler 100 by compressing members 210A, 210B towards one another until wedges 211 clear end 167 of frame member 166. In this position, clip member 209 can be removed from frame member 166 to remove locking element 107A from coupler 100.

Each arm 254, 256 of locking element 107A includes a barb 262, 264 extending therefrom. Arms 254, 256 flex to allow ends 258 of arms 254, 256 and barbs 262, 264 to move independently and relative to main body 252, as described further below. See FIG. 8. In the example shown, ends 258 of arms 254, 256 are curved outwardly in a direction opposite to that of barbs 262, 264 to allow the user to easily grasp and move a respective arm into the unlocked position away from the exterior surface 309 of trough members 300A, 300B. Other configurations are possible, such as forming ends 258 that extend in alternative angles from arms 254, 256.

In example embodiments, each barb 262, 264 extends at an angle towards the opposite barb 262, 264 and main body 252. Each barb 262, 264 extends to a point 263 that is configured to engage exterior surface 309 of trough members 300A, 300B, as described below. For example, in one embodiment barbs 262, 264 are generally formed in an arrow shape so that points 263 engage, hold, grip, seize, or otherwise interface with exterior surface 309 of trough members 300A, 300B.

For example, barbs 262, 264 can be made of a plastic or metal material that is configured to engage exterior surface 309. In one embodiment, barbs 262, 264 are embedded within arms 254, 256 of locking element 107A during or after the process of molding locking element 107A. In another embodiment, barbs 262, 264 are coupled to arms 254, 256 of locking element 107A using a fastener or adhesive. Other configurations are possible.

II. Trough

Figure 5:
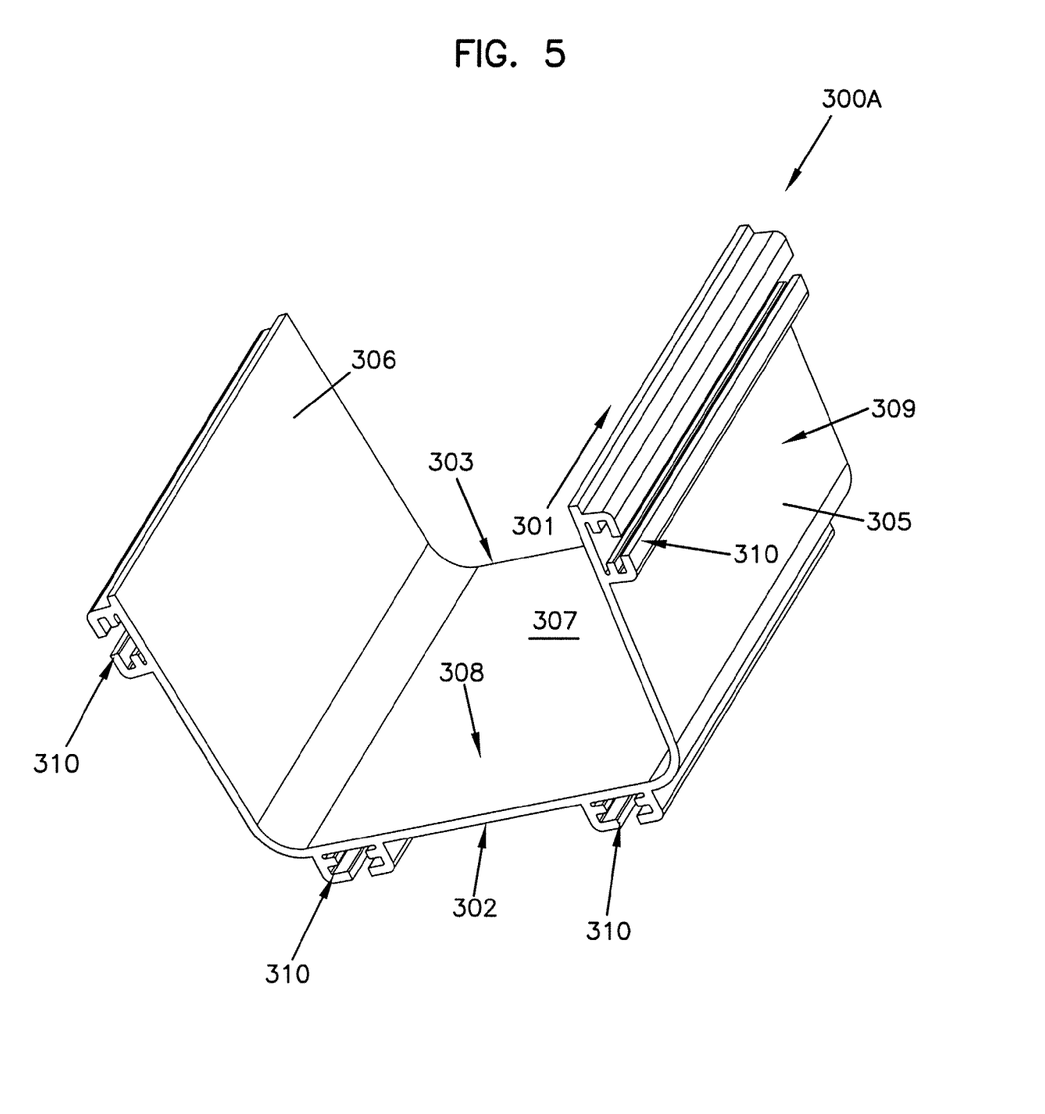
FIG. 5 is a perspective view of an embodiment of a trough member of the trough system of FIG. 1.

Referring now to FIG. 5, trough member 300A is shown in more detail. As used herein, the phrase "trough member" is used to refer to any trough, fitting, railway, raceway, or similarly configured component including any number of ends. Although a specific embodiment of a trough member is shown in and described herein, other trough members can also be used.

Trough member 300A includes a first terminal end 302 and a second terminal end 303. Trough member 300A is generally in the shape of a trough including first and second side walls 305, 306 coupled by a bottom wall 307, thereby defining an interior surface 308 and an exterior surface 309. Walls 305, 306, 307 are each generally planar. The exterior surface 309 defines one or more slots 310 on the side walls 305 and 306 and bottom wall 307. The slots 310 extend in a longitudinal direction 301 of the trough member 300A from the first terminal end 302 to the second terminal end 303. Typically, slots are provided for at least one or more of locking element 107A, 107B, 107C, 107D, as described further below.

Alternative configurations and placement for the slots 310 are also possible. For example, slots 310 can be T-slots, as shown on the example embodiment of the trough 300A. As used herein, the term "T-slot" means a slot having a narrow access opening and a wider interior region. In addition, the slots 310 may also be flanges or opposing projections. For example, trough member 300B, shown in FIGS. 6 and 7, includes slots defined by flanges 370 on side walls, rather than T-slots. Other configurations are possible. Example slot configurations include two opposing surfaces that extend in the longitudinal direction 301, although a single surface may also be used. Slots 310 may not extend fully between the terminal ends of the trough member. The placement of the slots on the exterior surface of the trough members may be altered. More or fewer slots can also be provided.

III. System

Referring now to FIGS. 2, 3, 5, and 6-8, terminal ends 302, 303 of the trough members 300A, 300B are slidingly engaged in the spacing 103 between the first and second guiding surfaces 101 and 102 of the coupler 100. The thickness of the walls of each of the trough members 300A, 300B, or the distance between the inner and outer surfaces 308, 309, are sized to fit within the spacing 103 of the coupler 100. The coupler 100 overlaps the terminal ends 302, 303 of each of the trough members 300A and 300B to form the coupling, the overlap defining an overlap region.

Figure 6:
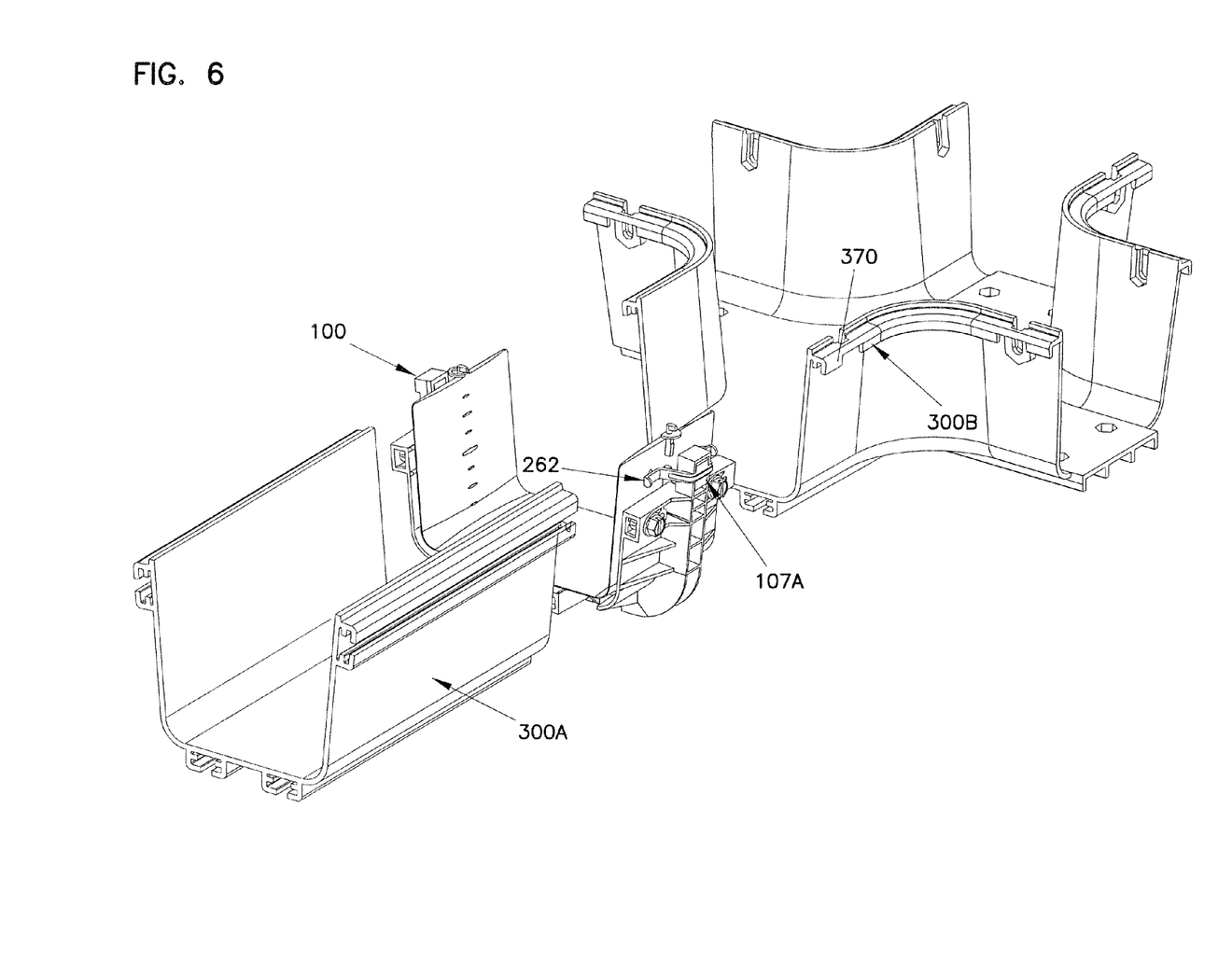
FIG. 6 is another perspective view of the trough system shown in FIG. 1 in an uncoupled state.
Figure 7:
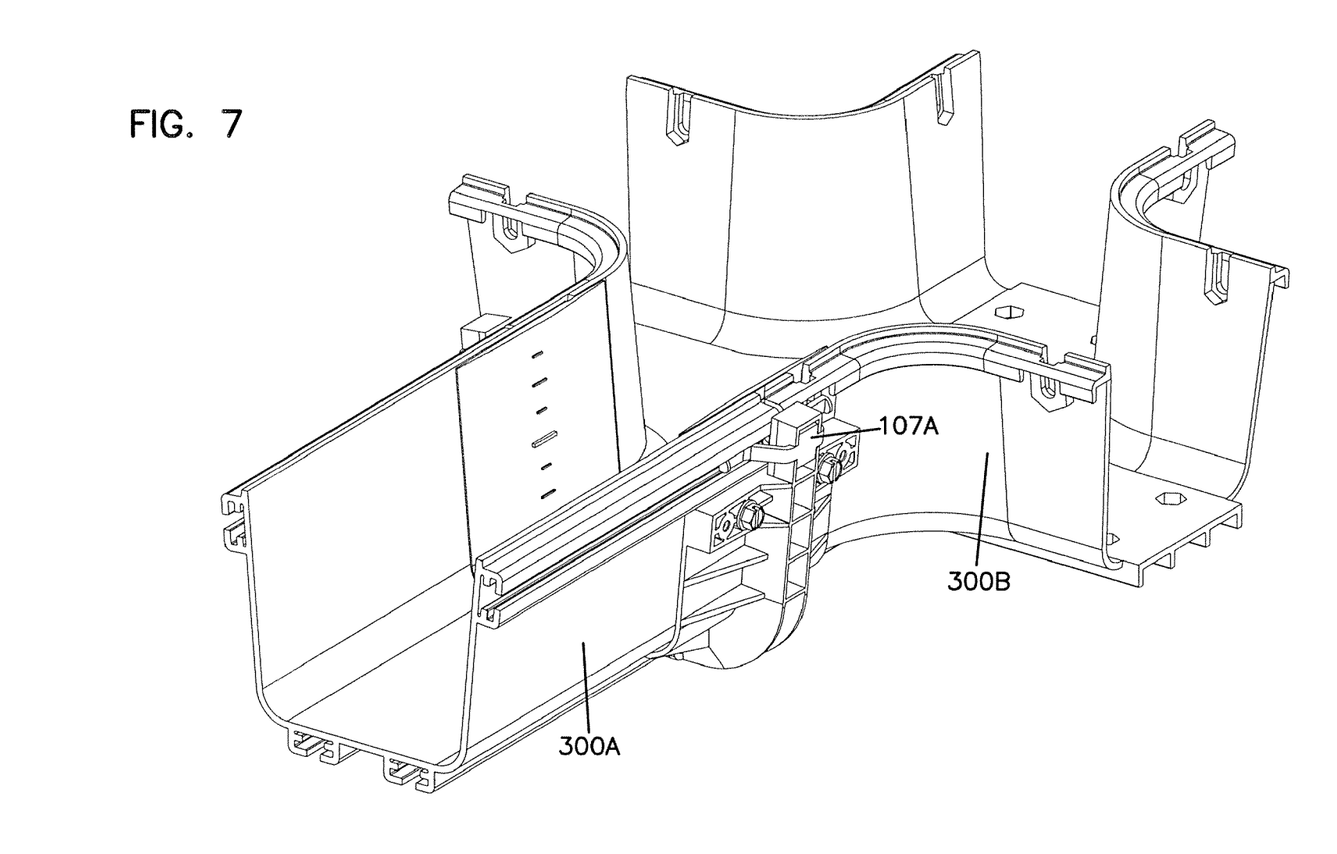
FIG. 7 is a perspective view of the trough system of FIG. 6 in a coupled state.
Figure 8:
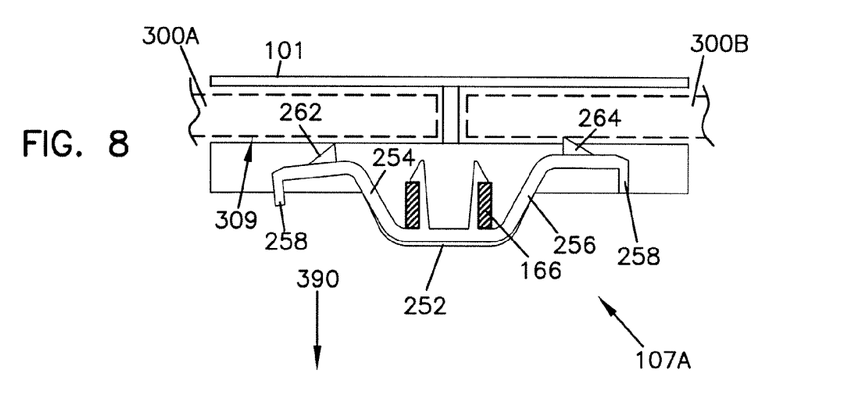
FIG. 8 is a top cross-sectional view of a portion of the coupler of FIG. 7.

As terminal ends 302, 303 of each trough member 300A, 300B are inserted into a respective end 110, 111 of the coupler 100, arms 254, 256 of locking elements 107A extend into slots 310 of trough members 300A, 300B. Barbs 262, 264 engage exterior surfaces 309 of each trough member 300A, 300B within slots 310. Since barbs 262, 264 are angled towards midpoint 175 of coupler 100, exterior surfaces 309 of trough members 300A, 300B slid along barbs 262, 264 until each terminal end 302, 303 is fully inserted in direction 190 into coupler 100.

In this position, as shown in FIG. 8, points 263 of barbs 262, 264 of locking element 107A are in a locked position engaging exterior surfaces 309 of each trough member 300A, 300B to resist movement of trough members 300A, 300B out of spacing 103 in a direction opposite to that of direction 190. In this manner, locking element 107A couples trough members 300A, 300B to coupler 100.

To release one or both of trough members 300A, 300B from coupler 100, ends 258 of arms 254, 256 are moved in a direction 390 opposite to trough member 300A, 300B to move barbs 262, 264 away from exterior surface 309 to an unlocked position. Arms 254, 256 flex to allow barbs 262, 264 to clear exterior surfaces 309 of trough members 300A, 300B. Once barbs 262, 264 clear exterior surfaces 309, trough members 300A, 300B can be removed from spacing 103 of coupler 100.

For example, end 258 of arm 254 is illustrated in FIG. 8 as being moved in direction 390 into a flexed state (i.e., unlocked position) so that barb 262 clears exterior surface 390 of trough member 300A so that trough member 300A can be removed from coupler 100. In example embodiments, each end 258 of arms 254, 256 can be moved separately to separately release trough members 300A, 300B. Alternatively, both ends 258 can be moved at the same time to release both trough members 300A, 300B at the same time.

The other locking elements 107B, 107C, 107D function in a manner similar to that of locking element 107A.

IV. Method of Use

An example method for coupling one or both of trough members 300A, 300B to coupler 100 is as follows. Locking elements 107A, 107B, 107C, and 107D are coupled to coupler 100. Terminal end 302 of trough member 300A is inserted into spacing 103 of coupler 100 in direction 190, thereby causing exterior surface 309 of trough member 300A to slid along barbs 262 of locking elements 107A, 107B, 107C, and 107D.

With trough member 300A fully inserted into coupler 100, barbs 262 of locking elements 107A, 107B, 107C, 107D engage exterior surface 309 of trough member 300A to resist movement of trough member 300A out of spacing 103 in the direction opposite to that of direction 190. Trough member 300B can be coupled to second coupler end 111 of coupler 100 in a similar manner.

An example method of removing trough member 300A includes moving ends 258 of arms 254 of locking elements 107A, 107B, 107C, 107D in a direction opposite to trough member 300A to move barbs 262 away from exterior surface 309. Arms 254 flex to allow barbs 262 to clear exterior surface 309 of trough member 300A. Once barbs 262 clear exterior surfaces 309, trough member 300A can be removed from spacing 103 of coupler 100. Trough member 300B can be removed in a similar fashion.

In example embodiments, the locking elements disclosed herein are tool-less in that the locking elements do not require a separate tool to move the locking elements from the locked position to the unlocked position and vice versa. For example, in some embodiments, the locking elements can be moved from the locked position to the unlocked position through the use of the user's hand.

In example embodiments, the locking elements disclosed herein are auto-locking, in that the locking elements can be placed in the locked position prior to insertion of the trough member into the coupler. When the trough member is introduced into the coupler, the locking elements automatically lock the trough member to the coupler. The locking elements can subsequently be moved to the unlocked position to release the trough member from the coupler.

Alternative embodiments to those provided herein are also possible. For example, in alternative embodiments, other features or components are included at the ends of the arms of the locking elements to assist a user in moving the arms and associated barbs away from the exterior surface of the trough members. In other embodiments, the locking elements can be positioned to engage a portion of the exterior surface of the trough member outside the T-slot.

The coupler and trough members disclosed herein are presented by way of example only, and other configurations are possible. For example, a coupler can be configured to be coupled to more than two trough members, therefore including more than the first and second coupler ends. Further, a greater number of locking elements can be presented for each coupler end, or, alternatively, fewer locking elements such as, for example, two on opposing sides, can be used.

The above specification, examples and data provide a complete description of the manufacture and of the invention. Since many embodiments of the invention can be made without departing from the spirit and scope of the disclosure, the invention resides in the claims hereinafter appended.

What is claimed is:

1. A locking element for coupling a coupler to a trough member, the locking element comprising:
    a main body;
    a clip member configured to couple the main body to the coupler;
    a first arm extending from the main body, the first arm being configured to flex relative to the main body;
    a first barb coupled to the first arm, wherein the first barb is made of metal and extends to a first point configured to engage an exterior surface of a first trough member; and
    a first end extending from the first arm in a direction away from that of the first barb and configured to allow a user to grasp the first end and move the first arm independently and relative to the main body away from the exterior surface of the first trough member to disengage the first barb from the exterior surface of the first trough member.

2. The locking element of claim 1, further comprising:
    a second arm extending in opposition to the first arm from the main body, the second arm being configured to flex relative to the main body;
    a second barb coupled to the second arm, wherein the second barb extends to a second point configured to engage an exterior surface of a second trough member; and
    a second end extending from the second arm in a direction away from that of the second barb and configured to allow a user to grasp the second end and move the first arm independently and relative to the main body away from the exterior surface of the second trough member to disengage the second barb from the exterior surface of the second trough member.

3. The locking element of claim 2, wherein each of the first and second points of the first and second barbs extends toward an opposite one of the first or second barbs.

4. The locking element of claim 2, wherein each of the first and second barbs are coupled to the first and second arms at an angle with respect to the exterior surfaces of the first and second trough members.

5. A coupler for a cable trough system, the coupler comprising:
    a body including a bottom wall and two side walls defining a trough, the body having a body terminal end defining an overlap region, the overlap region being sized to slideably receive a terminal end of a trough member along a longitudinal direction of the body; and
    a locking element including a main body, a clip member configured to couple the main body to the coupler, a first arm extending from the main body, the first arm being configured to flex relative to the main body, a first barb coupled to the first arm, the first barb being made of metal and extending to a first point configured to engage an exterior surface of the trough member, and a first end extending from the first arm in a direction away from that of the first barb and configured to allow a user to grasp the first end and move the first arm independently and relative to the main body away from the exterior surface of the trough member to disengage the first barb from the exterior surface of the trough member.

6. A cable trough system, the system including a coupler comprising:
    a body including a bottom wall and two side walls defining a trough, the body having a body terminal end defining an overlap region, the overlap region being sized to slideably receive a terminal end of a first trough member along a longitudinal direction of the body; and
    a locking element including a main body, a clip member extending from the main body, the clip member comprising first and second member arms with wedges positioned at ends thereof, the first and second member arms of the clip member being positioned to extend through a frame member on the body of the coupler so that the wedges are positioned to engage an end of the frame member to couple the locking element to the coupler, a first arm extending from the main body, the first arm being configured to flex relative to the main body, a first barb coupled to the first arm, the first barb extending to a first point configured to engage an exterior surface of the first trough member, and a first end curving from the first arm in a direction away from that of the first barb and configured to allow a user to grasp the first end and move the first arm independently and relative to the main body away from the exterior surface of the first trough member to disengage the first barb from the exterior surface of the first trough member.

7. The system of claim 6, wherein the locking element further comprises:
   a second arm extending in opposition to the first arm from the main body, the second arm being configured to flex relative to the main body;
   a second barb coupled to the second arm, wherein the second barb extends to a second point configured to engage an exterior surface of a second trough member; and
   a second end curving from the second arm in a direction away from that of the second barb and configured to allow a user to grasp the second end and move the first arm independently and relative to the main body away from the exterior surface of the second trough member to disengage the second barb from the exterior surface of the second trough member.

8. The system of claim 7, wherein each of the first and second points of the first and second barbs extends toward an opposite one of the first or second barbs.

9. The system of claim 7, wherein each of the first and second barbs are coupled to the first and second arms at an angle with respect to the exterior surfaces of the first and second trough members.

10. The system of claim 6, further comprising the first trough member defining a slot, wherein the first arm is received in the slot, and the first barb engages the exterior surface of the first trough member in the slot.

11. The system of claim 10, wherein the slot is defined by the exterior surface of the first trough member and extends in the longitudinal direction along the exterior surface of the first trough member from a terminal end of the first trough member to an opposing terminal end of the first trough member.

12. A method for coupling a coupler to a trough member, the method comprising:
   positioning a locking element on the coupler, the locking element including a main body, an arm extending from the main body, the arm being configured to flex relative to the main body, a barb coupled to the arm, wherein the barb is angled and extends to a point configured to engage an exterior surface of the trough member, and an end extends from the arm in a direction away from that of the barb;
   sliding the trough member into the coupler so that the exterior surface of the trough member slides along the barb until the trough member is inserted into the coupler;
   allowing the point of the locking element to engage the exterior surface of the trough member to resist movement of the trough member out of the coupler;
   flexing the end extending from the arm of the locking element away from the exterior surface of the trough member until the barb clears the exterior surface; and
   removing the trough member from the coupler.

\* \* \* \* \*

UNITED STATES PATENT AND TRADEMARK OFFICE
CERTIFICATE OF CORRECTION

PATENT NO. : 7,481,597 B2 Page 1 of 1
APPLICATION NO. : 11/677181
DATED : January 27, 2009
INVENTOR(S) : Beck

It is certified that error appears in the above-identified patent and that said Letters Patent is hereby corrected as shown below:

Page 2, (56) References Cited, U.S. Patent Documents: insert --Des. 348,651   7/1994 Henneberger-- in appropriate order       Page 2, (56) References Cited, Foreign Patent Documents: insert the omitted foreign patents below in appropriate order:
         --DE   102 12 285 A1   11/2002
         WO   2004/006400 A1   1/2004--

Signed and Sealed this

Twelfth Day of January, 2010

David J. Kappos
*Director of the United States Patent and Trademark Office*